US007987572B2

(12) United States Patent
Badman et al.

(10) Patent No.: US 7,987,572 B2
(45) Date of Patent: Aug. 2, 2011

(54) SPARK PLUG GROUND ELECTRODE SHIELD REMOVER

(75) Inventors: Jeffrey A. Badman, Huntington Woods, MI (US); Rudolph J. Makima, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1211 days.

(21) Appl. No.: 11/672,561

(22) Filed: Feb. 8, 2007

(65) Prior Publication Data

US 2008/0190245 A1 Aug. 14, 2008

(51) Int. Cl.
*B23P 19/04* (2006.01)
*B25B 27/00* (2006.01)

(52) U.S. Cl. ........................................ 29/402.03; 81/52

(58) Field of Classification Search ............... 29/402.01, 29/402.03, 402.06, 402.11, 402.15, 402.19, 29/426.1, 426.4, 426.5, 426.6; 81/52, 53.2
See application file for complete search history.

(56) References Cited

OTHER PUBLICATIONS

Technical service Bulletin, TSB 06-15-2, Aug. 7, 2006 Spark Plug Removal Instructions-5. 4 3V Motor Alldata www.motoralldata.com.*

* cited by examiner

*Primary Examiner* — John C Hong

(57) ABSTRACT

A tool for removing a spark plug from an internal combustion engine after such ground electrode shield has been broken away from an upper portion of a spark plug. The tool includes: a rod having a first end threaded to an interior portion of the shield; a hollow tube for receiving a portion of the rod between the first end of the rod and a second end of the rod, such tube having a stepped portion for engaging a shoulder of the engine; and an extracting means attached to the second end of the rod for generating a force axially along a longitudinal axis of the shield to remove the shield from the engine as such rod and shield are lifted by the generated force through the hollow region of the tube.

4 Claims, 9 Drawing Sheets

SPARK PLUG GROUND ELECTRODE SHIELD REMOVER

TECHNICAL FIELD

This invention relates generally to spark plug removers and more particularly to methods and tools for removing ground electrode shields lodged in the engine after breaking away from the upper, removed portion of the spark plug assembly.

BACKGROUND

Automotive technicians servicing automotive vehicles having certain types of spark plugs may over mileage and time-in-service not in some cases be able to remove one or more of such spark plugs without leaving a broken fragment of the plug remaining in the cylinder head. One such spark plug is shown in FIG. 1 to have an elongated, lower, metal ground electrode shield 10. Above the shield 10 is a threaded portion 12. Above the threaded portion is a nut portion 14. Above the nut portion is a ceramic portion 16. With one type of spark plug break, the ground electrode shield 10 may separate from the threaded portion 12 and 14 and thus the ground electrode shield 10 be left behind (i.e. or lodged) in the cylinder head of the engine 20 as an empty shell as shown in FIG. 2. It is noted in FIG. 2 that the spark plug is inserted into a bore 22 formed in the engine cylinder head 20, such bore 22 having a lower annular cavity portion 26 for receiving the shield 10 and tip 21 (FIG. 1) of the electrode of the spark plug and an upper larger diameter threaded annular cavity portion 28 for receiving the threaded potion 12 of the spark plug (FIG. 1). A flared shoulder 30 of the ground shield 10 separates the larger threaded annular cavity portion 29 from the lower annular cavity portion 26. The bore 22 has a third annular region 32 having a diameter larger than the diameter of the threaded annular cavity portion 28 for receiving a socket portion of a socket wrench (not shown) used to install and fasten the spark plug (FIG. 1) to the engine 20 and for replacing and removing the spark plug from the engine when replacement of the spark plug is necessary. Sometimes, as removal of the spark plug is necessary, excessive combustion deposits may have build up along in the lower annular cavity portion 26 over the life of the spark plug thereby requiring a large force to remove the plug, particularly the shield 10. Removal of the plug may result in the threaded portion 12 and ceramic portion 16 of the plug separating from the shield 10 thereby leaving the shield 10 in the engine as shown in FIG. 2. This breakage may require removing the cylinder head to dislodge the shield 10 from the combustion chamber side of the head. This method is a relatively costly process.

SUMMARY

In accordance with the present invention, a tool is provided for removing a spark plug ground electrode from an internal combustion engine after such ground electrode shield has been broken away from an upper portion of a spark plug. The tool includes a rod having a threaded lower end for screwing into an upper threaded interior portion of the shield and an upper end; and a hollow tube for receiving into an interior region thereof a portion of the rod between the upper end of the rod and lower end of the rod. The tube has a stepped exterior portion for engaging and centering on a shoulder of the engine cylinder head when the rod is screwed into the threaded shield. An extracting means is attached to the upper end of the rod for engaging an upper end of the tube to generate a force axially along a longitudinal axis of the shield to remove the shield from the engine as such rod and shield are lifted by the generated force through the hollow region of the tube, resting on the shoulder of the engine.

In one embodiment, a tool is provided for removing a spark plug electrode shield from an internal combustion engine after such ground electrode shield has been broken away from an upper portion of a spark plug. The tool includes a rod having a first threaded portion at a first end thereof for screwing into an upper tapped hollow region of the ground electrode shield and a second threaded portion at a second end thereof. A tube is provided having a inner portion for receiving a portion of the rod between the upper end of the rod and the lower end of the rod; such tube having a stepped exterior portion adjacent to, and displaced from, a first end of such tube for engaging an annular shoulder region disposed above a bore in the engine, a lower end of such bore having disposed therein an upper region of the shield, such shoulder being displaced from the upper region of the shield. A washer is disposed about a portion of the second threaded portion of the rod. A nut threaded on the second threaded portion with the washer being disposed between a second end of the tube with rotation of the nut on the second threaded portion of the rod generating a force between: the rod and the shield threaded to such rod; and, the shoulder engaging the stepped portion of the tube, such generated force being axially along a longitudinal axis of the shield to remove the shield from the engine as such rod and shield are forced by the rotation of the nut through the hollow region of the tube.

In accordance with another feature of the invention, a rod having a first threaded portion at a first end thereof and a second threaded portion at a second end thereof; a tube having a inner portion for receiving a portion of the rod between the first end of the rod and the second end of the rod; such tube having a stepped exterior portion adjacent to, and displaced from, a first end of such tube; a washer disposed about a portion of the second threaded portion of the rod and disposed on a second end of the tube; and a nut threaded on the second threaded portion with the washer disposed between the second end of the tube and the nut.

In accordance with still another feature of the invention, a method is provided for removing a spark plug ground electrode shield from an internal combustion engine after such ground electrode shield has been broken away from an upper portion of a spark plug. The method includes: tapping threads into an upper portion of the ground electrode shield; inserting a tube having a inner portion for receiving a portion of the rod between the first end of the rod and a second end of the rod; such tube having a stepped exterior portion adjacent to, and displaced from, a first end of such tube for engaging an annular shoulder region disposed above a bore in the engine, a lower end of such bore having disposed therein the upper region of the shield, such shoulder being displaced from the upper region of the shield; inserting a rod having a first threaded portion at a first end thereof into the upper tapped region of the ground electrode shield; placing a washer on a second end of the tube and about a portion of the second threaded portion of the rod; and rotating a nut threaded on the second threaded portion with the washer disposed between the second end of the tube with the rotation of the nut on the second threaded portion of the rod generating a force axially along a longitudinal axis of the shield to remove the shield from the engine as such rod and shield are forced by the rotation of the nut through the hollow region of the tube.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
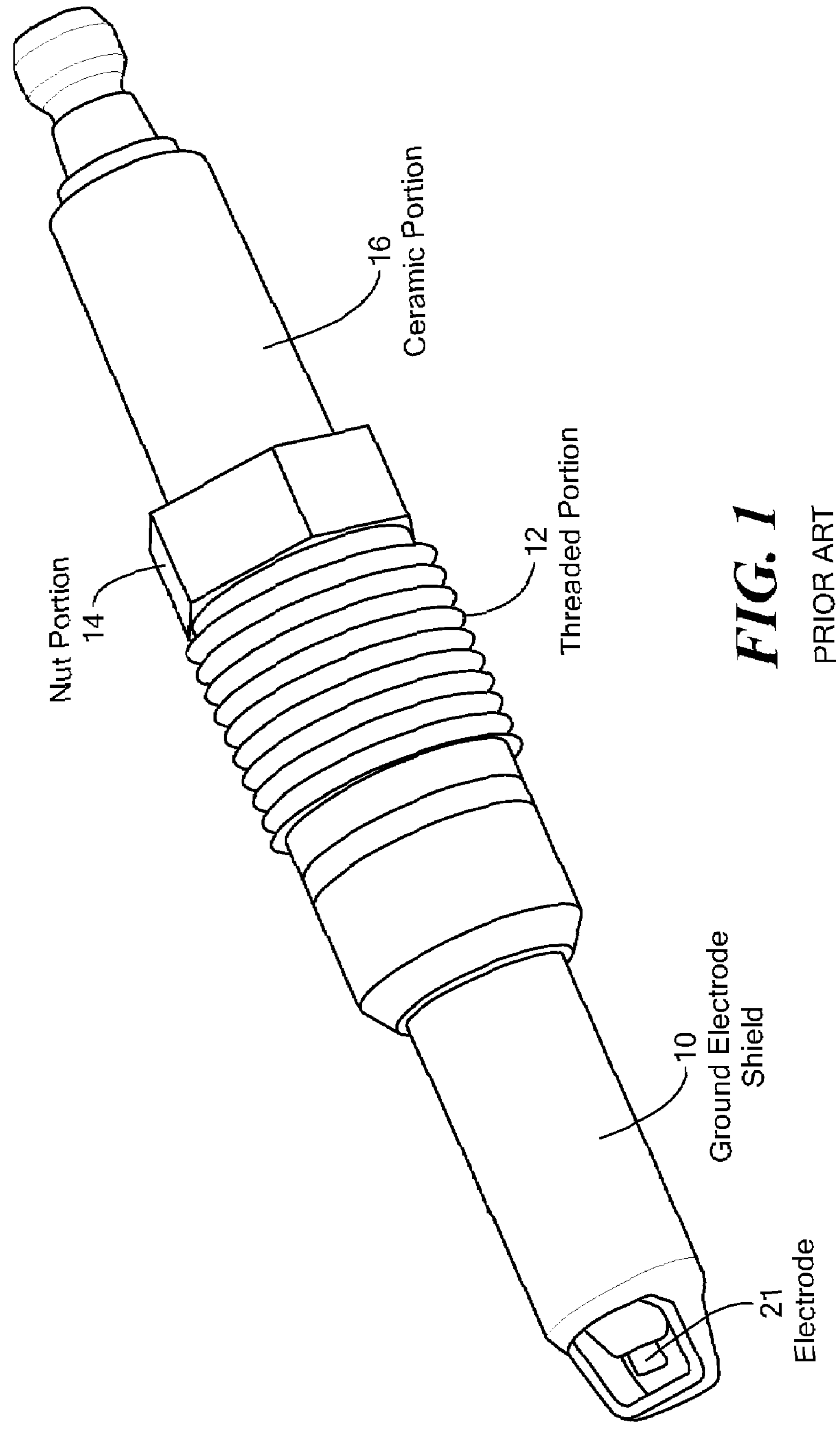
FIG. 1 PRIOR ART
FIG. 1 is a drawing of a spark plug according to the PRIOR ART.
Figure 2:
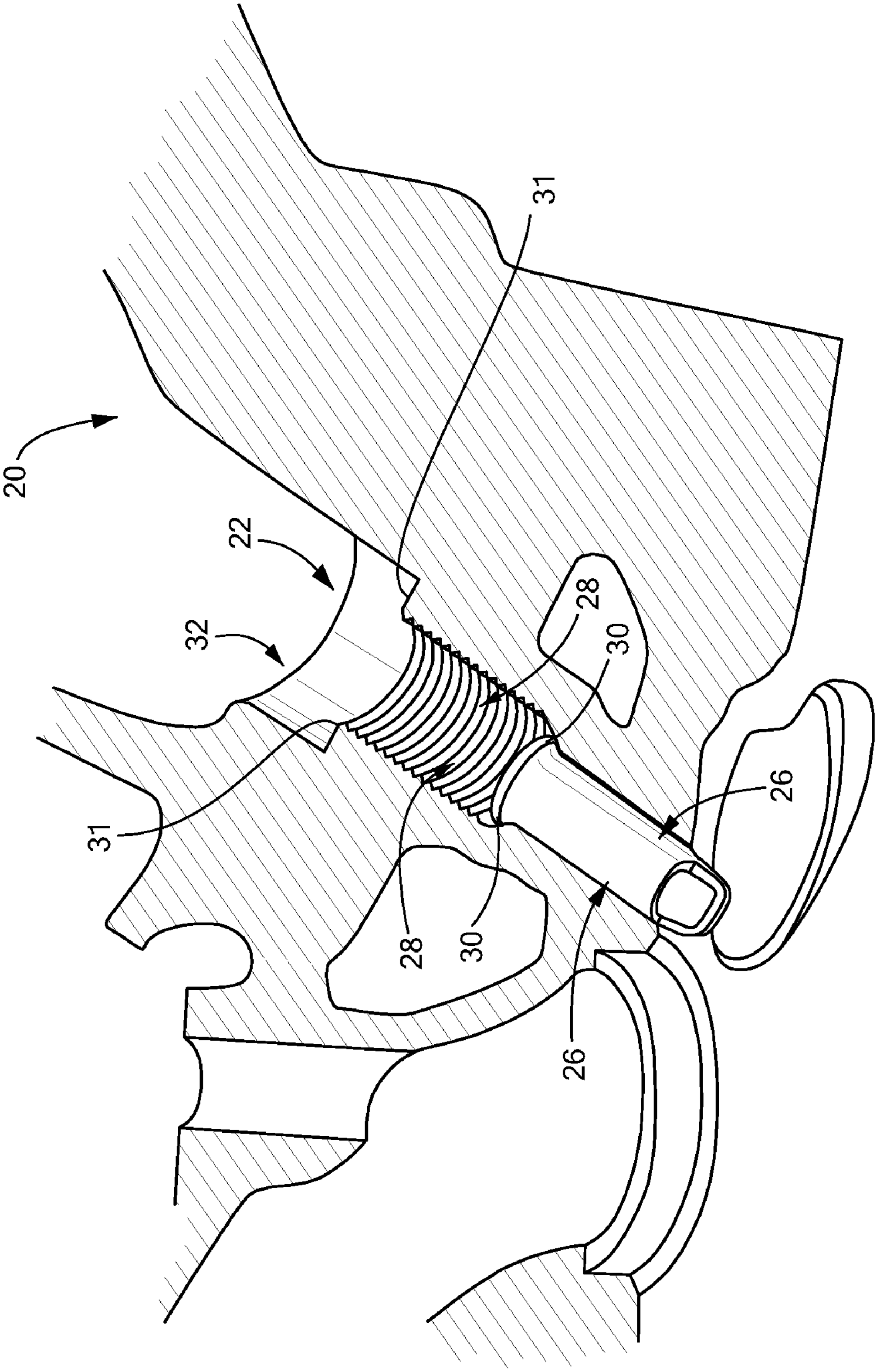
FIG. 2 is a cross sectional drawing of an engine having lodged therein a ground electrode shield of the spark plug of FIG. 1 according to the PRIOR ART.

Referring now to FIGS. 3-9, a spark plug ground electrode shield 10 removing tool 40 is shown for removing the ground electrode shield 10 shown in FIG. 2 from the internal combustion engine 20 (FIG. 2) after such ground electrode shield 10 has been broken away from the upper portion of the spark plug shown in FIG. 1 and which shield 10 has remained lodged in the engine 20, as shown in FIG. 2. Here, the ground electrode shield 10 is left behind as an empty shell; i.e., the lodged shield 10 having a hollow upper portion. Here, for example, the spark plug is Motorcraft brand, part number PZT2FE.

As noted above, the spark plug is inserted into a bore 22 (FIG. 2) formed in the engine 20, such bore 22 having a lower annular cavity portion 26 for receiving the shield 10 and tip 21 (FIG. 1) of the electrode of the spark plug and an upper larger diameter threaded annular cavity portion 28 for receiving the threaded portion 12 of the spark plug (FIG. 1). Here the engine is a Ford Motor Company, three valve per cylinder, engine. A sloped or tapered shoulder 30 of the ground shield 10 separates the larger threaded annular cavity portion 28 from the lower annular cavity portion 26. The bore 22 has a third annular region 32 having a diameter larger than the diameter of the threaded annular cavity portion 28 for receiving a socket portion of a socket wrench (not shown) used to install and fasten the spark plug (FIG. 1) to the engine 20 and for replacing and removing the spark plug from the engine when replacement of the spark plug is necessary. A second shoulder 31 separates the larger threaded annular cavity portion 28 from the third annular region 32.

Figure 3:
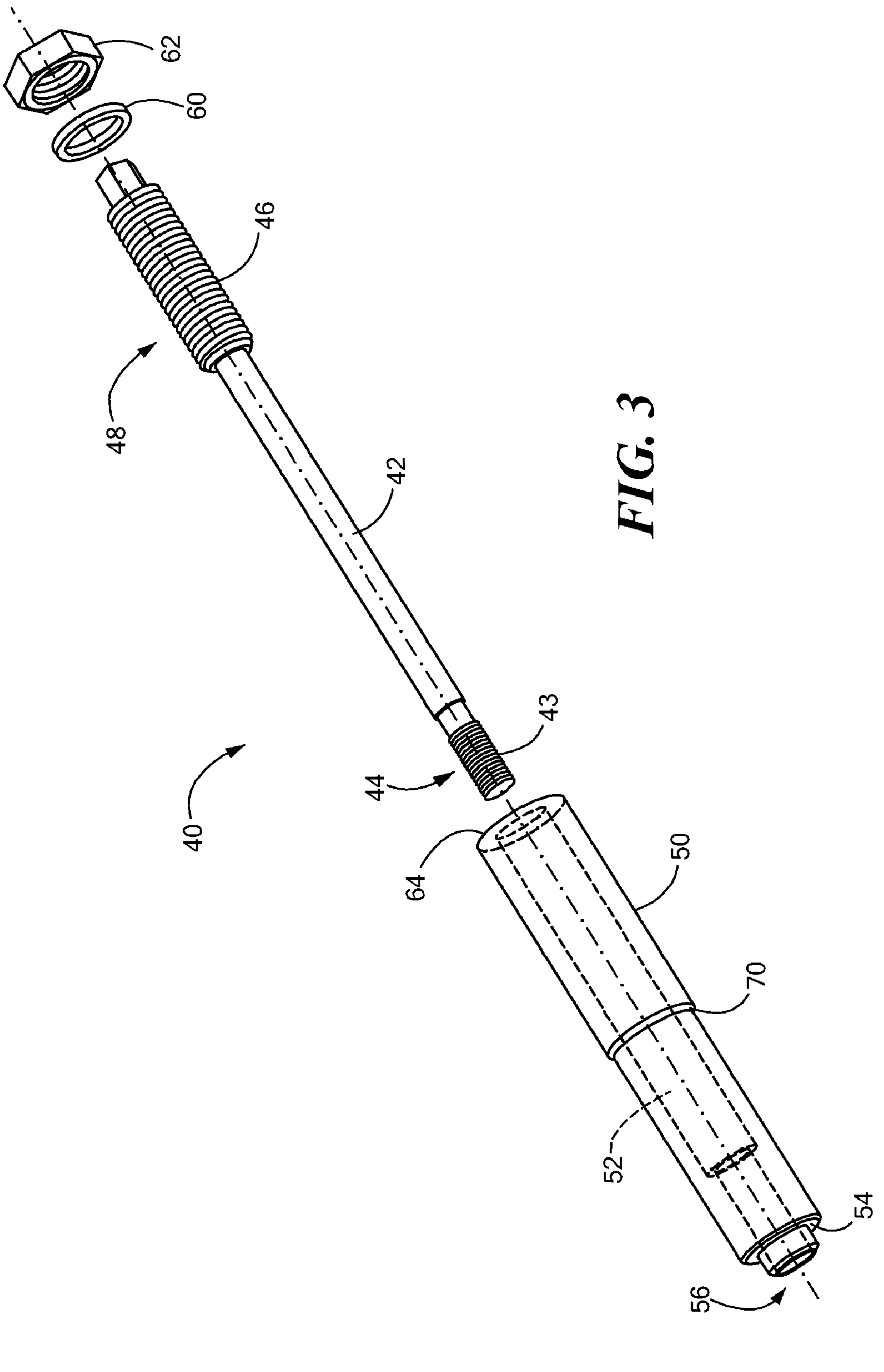
FIG. 3 is a three dimensional exploded view of a tool used to remove the lodged ground electrode shield shown in FIG. 2 from the engine according to the invention.
Figure 4:
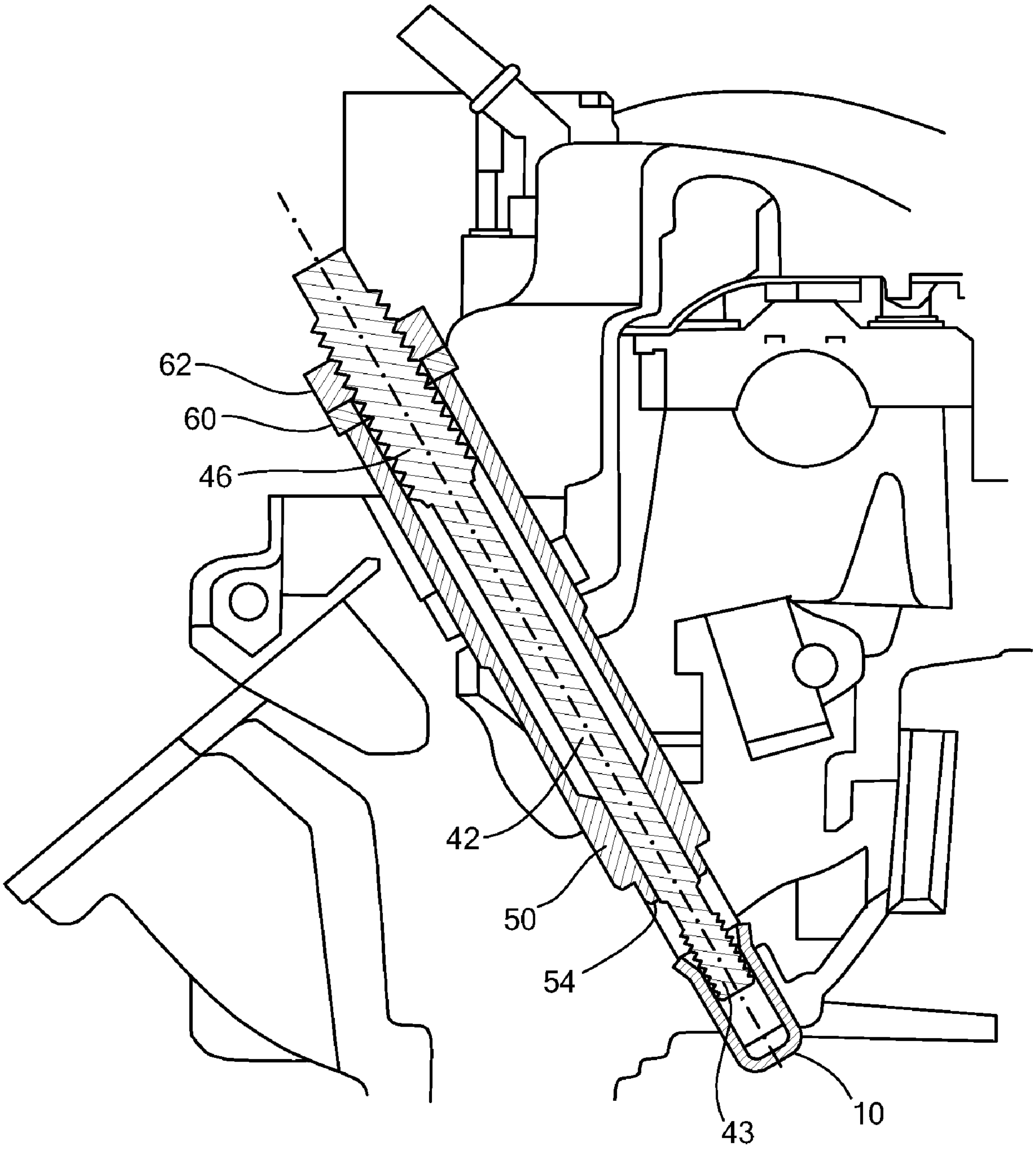
FIG. 4 is a cross sectional view of the engine having lodged therein a ground electrode shield of the spark plug of FIG. 2 with the tool of FIG. 3 inserted into a the shield according to the invention.

The tool 40, as shown in FIGS. 3 and 4 includes: a rod 42, or center shank, having a first threaded portion 43 at a first end 44 thereof and a second threaded portion 46 at a second end 48 thereof; a hollow tube 50, or pilot bushing, having a inner portion 52 for receiving the rod 42; such tube 50 having a stepped exterior portion 54 adjacent to, and displaced from, a first end 56 of such tube 50; a bushing or washer 60, here for example, of a Nylon material, disposed about a portion of the second threaded portion 48 of the rod 42; and a jack nut 62 threaded on the second threaded portion 46 of the rod with the washer 60 disposed between a second end 64 of the tube 50 and the nut 62, as shown more clearly in FIG. 4. Referring again to FIG. 3, the tube 50 has a second stepped region 70.

Figure 10:
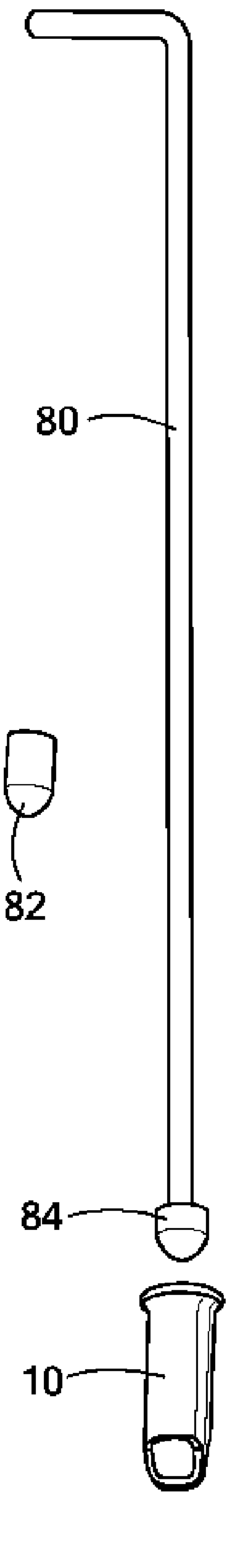
FIG. 10 is a drawing on rubber caps and an installation rod used in the process of trapping thread chips during removal of the lodged ground electrode shield.

The process of extracting the ground electrode shield 10 follows: Once there is only an empty (i.e., hollow) ground electrode shield 10 left in the cylinder head, as shown in FIG. 2, the following steps are used to remove the shield 10 using the tool 40 shown in FIGS. 3 and 4. First, the hollow central portion of the lodged ground electrode shield 10 is thread tapped using a 9.0×1.0 mm “plug” tap. A rubber “automotive-type” vacuum cap of rubber plug 82, 84, FIG. 10, of the type typically used in cars to plug vacuum lines is placed at the tip of the tap to prevent cuttings made by the tap from falling into the combustion chamber of the engine. A tool 80 (FIG. 10) is a piece of drill rod (i.e., an installation rod) is used to put the rubber caps 82, 84 into the ground sleeve 10.

The tap profile is about 3-4 reduced diameter threads on the tip end. More particularly, the end of the tap is coated with general-purpose grease. The tap is turned about 3 to 4 turns into the hollow upper end of the lodged ground electrode shield 10 once the tap begins to cut. As the shield 10 is tapped, for every ½ turn, the tap should be backed up ⅛ turn to “break chips” and prevent any cut material from coiling-up and laying in the spark plug well. All of the thread chips will embed in the grease pack or drop inside the vacuum cap 82, 84 (FIG. 10) placed in the hollow shield 10 prior to the tapping. A suitably sized tap wrench, not shown, of about 7-9 inches in handle length will aid in reaching down the well. If not available, use an 8-point socket with a ratchet and drive extension. The shank or rod 42 should be maintained in alignment with the axis of the spark plug bore cavity to prevent possible thread bore damage. Care should be used so as not to damage any spark plug threads on the way in. Next, the tap is carefully backed out the tap while maintaining the residual grease coat on the tap which contains some chips. Care must be taken so as not to touch the sides of the spark plug well bore during removal.

Once the ground electrode shield 10 is tapped, the tube 50 is inserted into the spark plug well ensuring that the stepped region 54 (FIG. 3) bottoms out and thereby engages the stepped shoulder 31, and (FIG. 2).

Next, the threaded end 43 of rod 40 is screwed into the tapped ground electrode shield 10. The rod 42 should not be over tightened to prevent thread stripping. Next, the nylon washer 60 (FIG. 3) and jack nut 62 are installed until finger tight. Next, the jack nut 62 is turned with a socket and ⅜" drive ratchet, not shown, until the ground electrode 10 is freed from the bore 22. More particularly, turning the jack nut 62 results in the rod 42 being lifted axially within the tube 50. The resultant downward force created by the action of the nut 62 turning, forces the load bearing shoulder 54 of tube 50 down against the stepped, bearing shoulder 31 of the cylinder head. Several turns of the nut 62 may be required. Upon removal, the rubber plug 82. 84 sitting at the bottom of the ground electrode shield 10 will capture any remaining chips not caught earlier by the tap grease.

Thus, as the nut 62 is threaded on the second threaded portion 48 of the rod 42 with the washer 60 disposed between the end 64 of the tube 50 and the nut 62, rotation of the nut 62 on the second threaded portion 48 of the rod 42 generates a force between: the rod 42, and the shield 10 threaded to such rod 42; and, the shoulder 54 of tube 50 (FIG. 3) engaging the stepped portion, i.e., stepped, bearing shoulder, 31 (FIG. 2) of the cylinder head 50, such generated force being axially along a longitudinal axis of the shield 10 to remove the shield 10 from the engine as such rod 42 and shield 10 are forced by the rotation of the nut 62 upwardly through the hollow region 52 of the tube 50.

The tool 40 uses a common screw thread shank (i.e., the rod 42) and the nut 62 as a puller. The bottom of the rod 42 is dimensioned with a 9×1.0 mm thread and pitch, which is suitable to fit in the broken piece which has an I.D. of 8 mm. As noted above, prior to insertion of the rod 42 in the spark plug fragment, the piece must be thread tapped using a commercially available 9.0×1.0 mm tap and suitable tap wrench of about 7-9" in length, also available commercially. The shank or rod 42 is robust enough not to break off or bend. Tap chips are circumvented from entering the engine by filling the fragment with general-purpose chassis grease and by daubing the end of the tap with the same grease for extra protection. Only 3-4 full threads 43 on portion 44 of rod 42 that were tapped in with a commercial 9 mm tap and tap handle are required for the special shank or rod 42 to engage, or thread itself properly into the fragment. Once tapped, the rod 42 is engaged into the fragment, the upper thread portion 48 (i.e., threads 46) of the rod 42 is threaded to a 16×2.0 mm thread and serves as a jackscrew/nut to exert the force needed to pull the fragment out. The nut friction is reduced by use of the nylon washer 60.

Figure 5A:
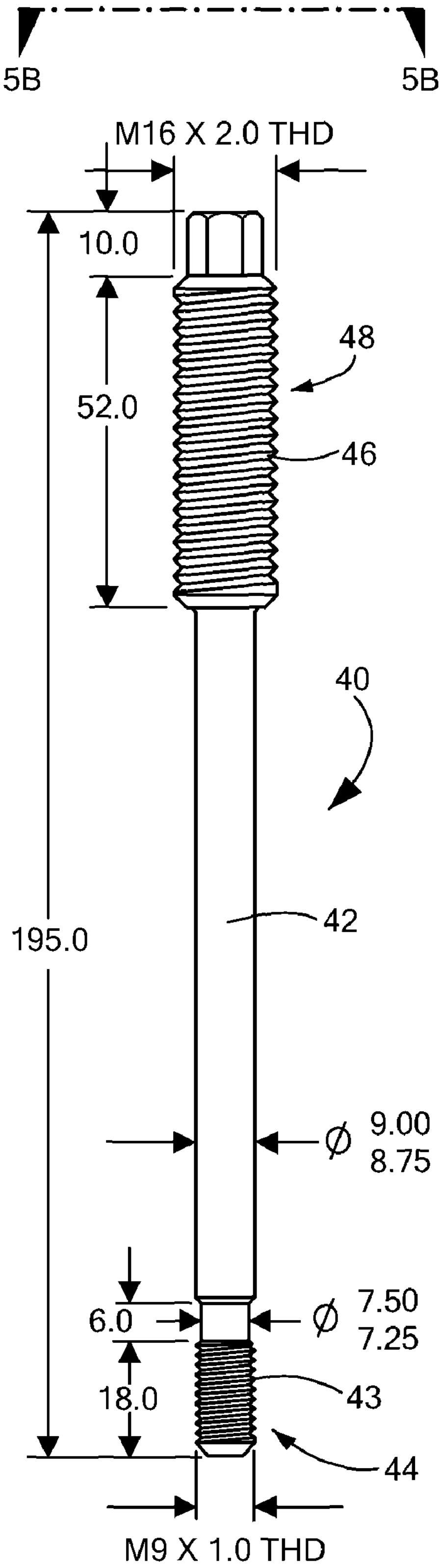
FIG. 5A is two-dimensional side view of a rod or center shank used in the tool of FIG. 3.
Figure 5B:
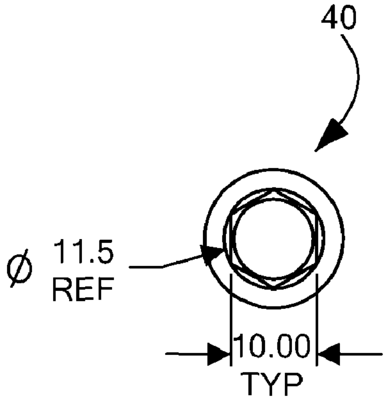
FIG. 5B is an end view of the rod in FIG. 5A viewed as indicated by the direction of the arrows 5B-5B in FIG. 5A.
Figure 6:
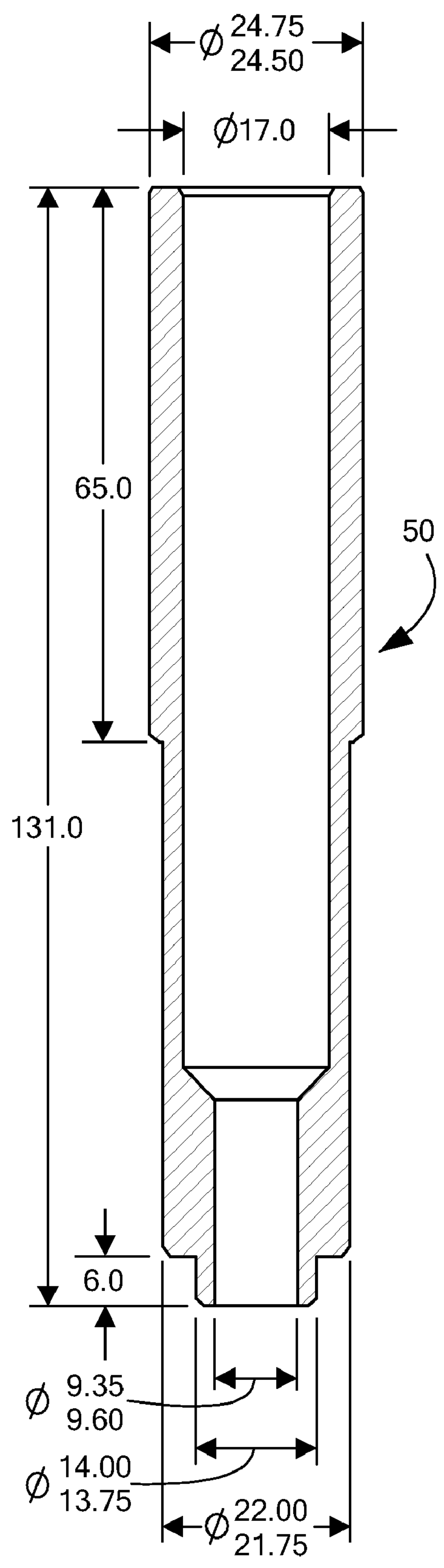
FIG. 6 is a two-dimensional cross sectional view of a tube or pilot bushing used in the tool of FIG. 3.
Figure 7:
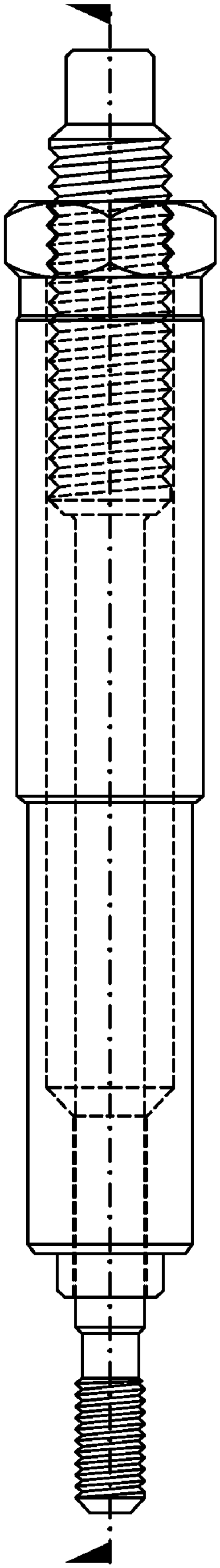
FIG. 7 is a two-dimensional cross sectional drawing of the tool of FIG. 3.
Figure 8:
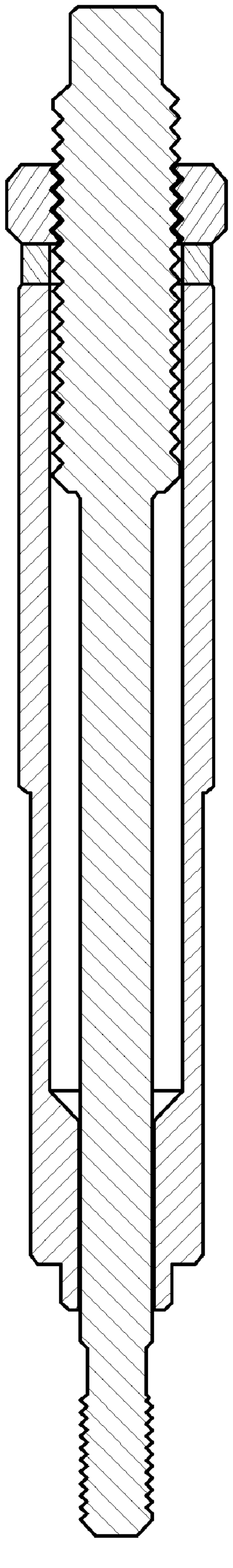
FIG. 8 a two-dimensional assembled view of the tool of FIG. 3.
Figure 9:
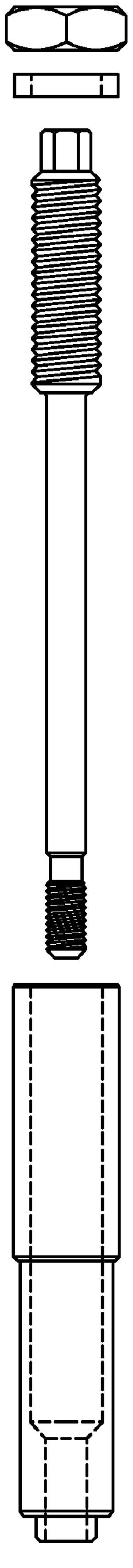
FIG. 9 is a two-dimensional exploded view of the tool of FIG. 3.

The dimensions shown in FIGS. 5 and 6 are in mm.

Thus, in summary, the method includes: tapping threads into an upper portion of the ground electrode shield and trapping the thread chips with a rubber plug; inserting a tube having a inner portion for receiving a portion of the rod between the first end of the rod and a second end of the rod; such tube having a stepped exterior portion adjacent to, and displaced from, a first end of such tube for engaging an annular shoulder region disposed above a bore in the engine, a lower end of such bore having disposed therein the upper region of the shield, such shoulder being displaced from the upper region of the shield; inserting a rod having a first threaded portion at a first end thereof into the upper tapped region of the ground electrode shield; placing a washer on a second end of the tube and about a portion of the second threaded portion of the rod; and rotating a nut threaded on the second threaded portion with the washer disposed between the second end of the tube with the rotation of the nut on the second threaded portion of the rod generating a force axially along a longitudinal axis of the shield to remove the shield from the engine as such rod and shield are forced by the rotation of the nut through the hollow region of the tube.

The following should be noted: Here a 9.0 mm×1.0 mm thread pitch is used to tap out the ground shield 10 and use the tool 40 to engage it; the rubber engine vacuum plug captures thread particles that can emit during the tapping operation; and the placement on the cylinder head (i.e., the engagement between the stepped portion of the rod and the shoulder (i.e., a bearing surface)), in which extraction forces bear upon.

Also, as noted in FIGS. 5A and 5B, the end view of rod 42 as viewed from the M16×20 end shown in FIG. 5B has a 10 mm hex used to accommodate a metric open end wrench, not shown, for turning rod 42 into shield 10, after it has been tapped out.

A number of embodiments of the invention have been described. Nevertheless, it will be understood that various modifications may be made without departing from the spirit and scope of the invention. Accordingly, other embodiments are within the scope of the following claims.

What is claimed is:

1. A tool comprising:

a rod having a first threaded portion at a first end thereof and a second threaded portion at a second end thereof;

a tube having a inner portion for receiving a portion of the rod between the first end and the second end; such tube having a stepped exterior portion adjacent to, and displaced from, a first end of such tube;

a washer disposed on a second end of the tube and disposed about a portion of the second threaded portion of the rod; and a nut threaded on the second threaded portion with the washer disposed between the second end of the tube and the nut.

2. A tool for removing a spark plug from an internal combustion engine after such ground electrode shield has been broken away from an upper portion of a spark plug, such tool comprising:

a rod having a first end threaded to an interior portion of the shield;

a hollow tube for receiving a portion of the rod between the first end of the rod and a second end of the rod, such tube having a stepped portion for engaging a shoulder of the engine; and an extracting means attached to the second end of the rod for generating a force axially along a longitudinal axis of the shield to remove the shield from the engine as such rod and shield are lifted by the generated force through a hollow region of the tube.

3. A tool for removing, a spark plug ground electrode shield from an internal combustion engine after such ground electrode shield has been broken away from an upper portion of a spark plug, comprising:

a rod having a first threaded portion at a first end thereof for screwing into a upper tapped hollow region of the ground electrode shield and a second threaded portion at a second end thereof;

a tube having a inner portion for a receiving a portion of the rod between a first end of the rod and a second end of the rod; such tube having a stepped exterior portion adjacent to, and displaced from, a first end of such tube for engaging an annular shoulder region disposed above a bore in the engine, a lower end of such bore having disposed therein the upper region of the shield, such shoulder being displaced from the upper region of the shield;

a washer disposed on a second end of the tube and disposed about a portion of the second threaded portion of the rod; and a nut threaded on the second threaded portion with the washer disposed between the second end of the tube with rotation of the nut on the second threaded portion of the rod generating a force axially along a longitudinal axis of the shield to remove the shield from the engine as such rod and shield are forced by the rotation of the nut through a hollow region of the tube.

4. A method for removing, a spark plug ground electrode shield from an internal combustion engine after such ground electrode shield has been broken away from an upper portion of a spark plug, comprising:

tapping threads in an upper portion of the ground electrode shield;

inserting a tube having a inner portion for receiving a portion of a rod between a first end of the rod and a second end of the rod; such tube having a stepped exterior portion adjacent to, and displaced from, a first end of such tube for engaging an annular shoulder region disposed above a bore in the engine, a lower end of such bore having disposed therein the upper portion of the shield, such shoulder being displaced from the upper portion of the shield;

inserting a rod having a first threaded portion at a first end thereof into an upper tapped region of the ground electrode shield;

placing a washer on a second end of the tube and about a portion of a second threaded portion of the rod; and rotating a nut threaded on the second threaded portion with the washer disposed between the second end of the tube with the rotation of the nut on the second threaded portion of the rod generating a force axially along a longitudinal axis of the shield to remove the shield from the engine as such rod and shield are forced by the rotation of the nut through a hollow region of the tube.

* * * * *